(12) United States Patent
Guo

(10) Patent No.: US 9,788,337 B2
(45) Date of Patent: Oct. 10, 2017

(54) DATA TRANSMISSION METHOD APPLIED TO A BASE STATION, A DATA RECEIVING METHOD APPLIED TO A USER EQUIPMENT, A DATA TRANSMISSION DEVICE APPLIED TO A BASE STATION, AND A DATA RECEIVING DEVICE APPLIED TO EACH USER EQUIPMENT IN A UE GROUP

(71) Applicant: ZTE CORPORATION, Shenzhen, Guangdong (CN)

(72) Inventor: Shengxiang Guo, Shenzhen (CN)

(73) Assignee: ZTE Corporation (CN)

( * ) Notice: Subject to any disclaimer, the term of this patent is extended or adjusted under 35 U.S.C. 154(b) by 112 days.

(21) Appl. No.: 14/651,477

(22) PCT Filed: Jul. 9, 2013

(86) PCT No.: PCT/CN2013/079060
§ 371 (c)(1),
(2) Date: Jul. 6, 2015

(87) PCT Pub. No.: WO2013/182115
PCT Pub. Date: Dec. 12, 2013

(65) Prior Publication Data
US 2015/0312923 A1    Oct. 29, 2015

(30) Foreign Application Priority Data
Dec. 12, 2012 (CN) .......................... 2012 1 0535546

(51) Int. Cl.
*H04W 72/10* (2009.01)
*H04W 72/12* (2009.01)
(Continued)

(52) U.S. Cl.
CPC ............ *H04W 72/10* (2013.01); *H04L 5/001* (2013.01); *H04L 5/0037* (2013.01);
(Continued)

(58) Field of Classification Search
None
See application file for complete search history.

(56) References Cited

U.S. PATENT DOCUMENTS

| 8,631,072 B2 * | 1/2014 | Damola ............... H04L 67/104 709/204 |
| 2008/0155120 A1 * | 6/2008 | Argawal ............... H04L 67/104 709/242 |

(Continued)

FOREIGN PATENT DOCUMENTS

| CN | 102255718 | 11/2011 |
| JP | 2011193444 | 9/2011 |

(Continued)

OTHER PUBLICATIONS

Extended European Search Report for European Application No. EP 13800316.5, Completed by the European Patent Office, Dated Nov. 26, 2015, 7 Pages.

(Continued)

*Primary Examiner* — Peter Chau
(74) *Attorney, Agent, or Firm* — Brooks Kushman P.C.

(57) ABSTRACT

A data transmission/receiving method and device are provided. The transmission method is applied to a base station, and includes allocating a network resource required for D2D communications for each UE in a UE group and using the network resource as a component carrier of each UE, each UE supporting carrier aggregation, and dividing the data to be transmitted to the UE group into a plurality of pieces of component data information and respectively transmitting same to each UE, each UE sharing the plurality of pieces of (Continued)

Each UE in a UE group is allocated with a network resource required for performing D2D communication, and the network resource is used as a component carrier of each UE, wherein, each UE supports CA — S102

Data to be transmitted to the UE group is divided into multiple pieces of component data information to be respectively transmitted to each UE, wherein, each UE shares the above multiple pieces of component data information transmitted to each UE via the component carrier — S104 component data information transmitted to each UE via the component carrier. The method and device provide a solution which uses D2D technology in a carrier aggregation yet, thereby achieving the convergence of carrier aggregation and D2D technology and improving the transmission efficiency of a mobile communication network while reducing the burden of the mobile communication network.

9 Claims, 4 Drawing Sheets

(51) Int. Cl.
*H04W 4/00* (2009.01)
*H04L 5/00* (2006.01)

(52) U.S. Cl.
CPC ......... *H04W 4/005* (2013.01); *H04W 72/121* (2013.01); *H04L 5/0044* (2013.01)

(56) References Cited

U.S. PATENT DOCUMENTS

| | | | |
|---|---|---|---|
| 2010/0106797 A1 | 4/2010 | Nagaraja | |
| 2011/0099228 A1* | 4/2011 | Smith | H04N 21/23103 709/205 |
| 2012/0157139 A1 | 6/2012 | Noh et al. | |
| 2012/0327760 A1* | 12/2012 | Du | H04L 1/1887 370/216 |
| 2013/0089020 A1* | 4/2013 | Hakola | H04L 1/1867 370/312 |
| 2013/0159407 A1* | 6/2013 | Koskela | H04L 67/1063 709/204 |
| 2013/0308490 A1 | 11/2013 | Lim et al. | |
| 2014/0105096 A1* | 4/2014 | Wang | H04L 12/189 370/312 |
| 2014/0140251 A1 | 5/2014 | Pan et al. | |
| 2014/0247802 A1* | 9/2014 | Wijting | H04W 76/023 370/329 |
| 2015/0131475 A1* | 5/2015 | Van Phan | H04W 84/18 370/254 |

FOREIGN PATENT DOCUMENTS

| | | |
|---|---|---|
| WO | 2011097812 | 8/2011 |
| WO | 2012108621 | 8/2012 |

OTHER PUBLICATIONS

International Search Report for PCT/CN2013/079060, English translation attached to original, Both completed by the Chinese Patent Office on Sep. 18, 2013, All together 4 Pages.

\* cited by examiner

DATA TRANSMISSION METHOD APPLIED TO A BASE STATION, A DATA RECEIVING METHOD APPLIED TO A USER EQUIPMENT, A DATA TRANSMISSION DEVICE APPLIED TO A BASE STATION, AND A DATA RECEIVING DEVICE APPLIED TO EACH USER EQUIPMENT IN A UE GROUP

CROSS-REFERENCE TO RELATED APPLICATION

This application is the U.S. national phase of PCT Application No. PCT/CN2013/079060 filed Jul. 9, 2013 which claims priority to Chinese Application No. 201210535546.8 filed Dec. 12, 2012, the disclosures of which are incorporated in their entirety by reference herein.

TECHNICAL FIELD

The present document relates to the field of communication, and specifically, to a data transmission/receiving method and device.

BACKGROUND

Device-to-Device (D2D) communication is a new technology of allowing communication by multiplexing intra-cell resources directly between User Equipments (UEs) under the control of a cellular system. The benefits brought by the technology includes: relieving load of the cellular network, reducing battery consumption of the UE, using radio resources more effectively, and achieving a larger signal coverage area and lower system interference level and so on. Moreover, the problem of wireless communication spectrum resource scarcity can be solved to a certain degree. Therefore, in recent years, the D2D technology has become a very promising new concept and got more and more extensive attention.

The carrier aggregation (CA) technology is introduced into a Long-Term Evolution Advance (LTE-A) standard since dispersed frequency spectrums can be grouped into large bandwidth with the carrier aggregation technology to satisfy the requirements of the future peak rate, and cell resources can be flexibly configured with the carrier aggregation technology, which maximally utilizes idle frequency spectrums. However, if the load of the cellular network is heavy, it is hard to find idle resources for the carrier aggregation. If the above two technologies can be integrated, that is, using the D2D technology in the carrier aggregation, on the one hand, cell resources can be configured conveniently and flexibly, and a utilization rate of the frequency spectrum can be increased; on the other hand, by utilizing high-quality D2D links and multiplexing cell resources, the transmission efficiency of the traditional cellular network can be further improved greatly, and the peak rate can also be enhanced for the users in the meantime. For example, when certain two users close to each other need to download the same large data (e.g. a song or a film), in the traditional method, each user needs to receive the complete data file via a cellular downlink of the user, but if it is to consider combining the carrier aggregation and the D2D, for example, a base station divides a datum B required to be transmitted into three component data blocks B1, B2 and B3 (B=B1+B2+B3) and transmits the component data blocks B1, B2 and B3 respectively to users, and each user performs data sharing via a D2D link in the meantime, on the one hand, the load of the cellular communication network is reduced, on the other hand, the transmission efficiency of the cellular network is also greatly enhanced.

With respect to the above problems in the related art, no effective solution has been proposed so far.

SUMMARY

With respect to the technical problems that there has been no solution which uses the D2D technology in the carrier aggregation yet, etc. in the related art, the present document provides a data transmission/receiving method and device, to at least solve the above problems.

According to one aspect of the present document, a data transmission method is provided, which is applied to a base station, and comprises:

allocating to each user equipment UE in a UE group a network resource required for performing device to device D2D communication, and using the network resource as a component carrier of each UE, wherein, each UE supports carrier aggregation CA; and dividing data to be transmitted to the UE group into multiple pieces of component data information to respectively transmit to each UE, wherein, each UE shares the multiple pieces of component data information transmitted to each UE via the component carrier.

The step of allocating to each user equipment UE in a UE group a network resource required for performing D2D communication comprises:allocating a network resource orthogonal to a mobile communication network for each UE; and/or allocating a network resource multiplexed with other UEs except the UE group for each UE.

In the step of allocating to each user equipment UE in a UE group a network resource required for performing D2D communication, the network resource orthogonal to the mobile communication network is preferentially allocated for each UE.

The method further comprises: before using the network resource as a component carrier of each UE, determining that the network resource can be used as the component carrier through at least one of the following conditions:

with respect to each UE in the UE group, a frequency band occupied by the network resource being supported; and with respect to each UE in the UE group, the component carrier having no interference to other component carriers of the UE.

The component data information comprises: component data blocks and target UE identification information of the component data blocks.

According to another aspect of the present document, a data receiving method is provided, which is applied to a user equipment UE, and comprises:

each UE in a UE group receiving multiple pieces of component data information from a base station, wherein, the multiple pieces of component data information are obtained by the base station dividing data to be transmitted to the UE group, and each UE supports carrier aggregation CA; and each UE using a network resource required for performing device to device D2D communication allocated for each UE as a component carrier, and sharing the multiple pieces of component data information via the component carrier.

The step of sharing the multiple pieces of component data information via the component carrier comprises: each UE orderly sharing the component data information according to a preset priority.

According to another aspect of the present document, a data transmission device is provided, which is applied to a base station, and comprises:

an allocation module, configured to: allocate to each user equipment UE in a UE group a network resource required for performing device to device D2D communication, and use the network resource as a component carrier of each UE, wherein, each UE supports carrier aggregation CA; and a transmission module, configured to: divide data to be transmitted to the UE group into multiple pieces of component data information to respectively transmit to each UE, wherein, each UE shares the multiple pieces of component data information transmitted to each UE via the component carrier.

The allocation module is configured to allocate the network resource for each UE in at least one of the following ways:

allocating a network resource orthogonal to a mobile communication network for each UE;

allocating a network resource multiplexed with other UEs except the UE group for each UE.

According to another aspect of the present document, a data receiving device is provided, which is applied to each user equipment UE in a UE group, and comprises:

a receiving module, configured to: receive multiple pieces of component data information from a base station, wherein, the multiple pieces of component data information are obtained by the base station dividing data to be transmitted to the UE group, and each UE supports carrier aggregation CA; and a sharing module, configured to: use a network resource required for performing device to device D2D communication allocated for each UE as a component carrier, and share the multiple pieces of component data information via the component carrier.

In the present document, the network resource required for performing device to device D2D communication allocated for each UE is used as a component carrier, and multiple pieces of component data information obtained by the base station dividing data to be transmitted to the UE group are shared by using the component carrier (CC), which solves the technical problems that there has been no solution which uses the D2D technology in the carrier aggregation yet, etc. in the related art, thereby achieving a convergence of the carrier aggregation and the D2D technology, and improving the transmission efficiency of the mobile communication network while reducing the load of the mobile communication network.

BRIEF DESCRIPTION OF DRAWINGS

Here, the described accompanying drawings are used to provide a further understanding of the present document and constitute a part of the present document. The schematic embodiments and illustrations thereof of the present document are used to explain the present document, but do not constitute an inappropriate limitation on the present document. In the drawings.

PREFERRED EMBODIMENTS OF THE DOCUMENT

The present document will be described in detail in combination with the accompanying drawings and embodiments below. It should be noted that the embodiments in the present document and the characteristics in the embodiments can be combined with each other in the condition of no conflict.

In consideration of the technical problems that there has been no solution which uses the D2D technology in the carrier aggregation yet, etc. in the related art, relevant solutions will be provided in combination with the embodiments below, which will be described in detail here.

Embodiment 1

Figure 1:
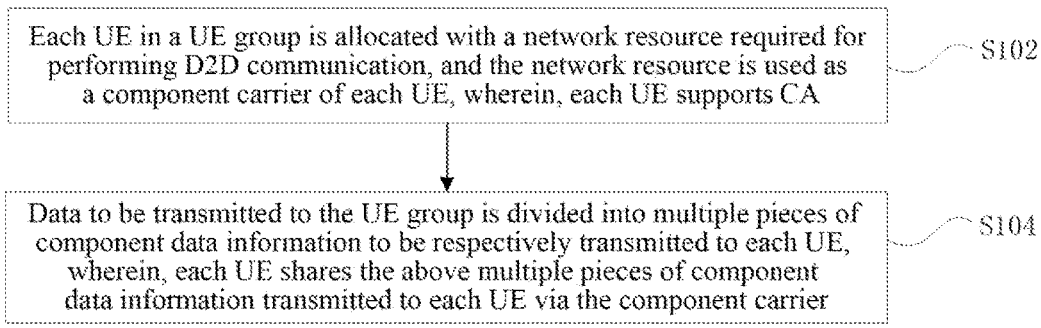
FIG. 1 is a flow chart of a data transmission method according to the embodiment 1 of the present document.

Descriptions are made from a base station side in the embodiment. The data transmission method in the embodiment is applied to a base station. FIG. 1 is a flow chart of a data transmission method according to the embodiment 1 of the present document. As shown in FIG. 1, the method includes the following steps.

In step S102, each UE in a UE group is allocated with a network resource required for performing D2D communication, and the network resource is used as a component carrier of each UE, wherein, each UE supports CA. It should be noted that the number of UEs in the above UE group can be two or more than two.

In step S104, data to be transmitted to the UE group is divided into multiple pieces of component data information to be respectively transmitted to each UE, wherein, each UE shares the above multiple pieces of component data information transmitted to each UE via the component carrier.

Through the above processing steps, since the network resource required for the UE performing D2D communication is used as the component carrier of the UE, and when the same data is transmitted for each UE, the data is divided into multiple pieces of component data information, and then the above component data information is shared through the above component carrier, thereby achieving a convergence of carrier aggregation and D2D technology.

In the specific implementation process, the step S102 can be represented in the following forms:

when multiple UEs supporting the carrier aggregation (equivalent to a UE group) download the same data via a cellular network, it is to check whether a D2D direct communication condition is satisfied between the UEs;

if the D2D direct communication condition is satisfied, the base station searches a D2D network candidate resource for the UEs satisfying the condition, and judges whether the candidate resource can be used as a component carrier of the D2D UE. If the D2D direct communication condition is not satisfied, data transmission is performed according to normal cellular communication.

Specifically, the base station preferentially allocates a resource orthogonal to the cellular network for the users satisfying the D2D direct communication condition, and if there is no orthogonal resource, a resource of other cellular mobile users is multiplexed. Both the orthogonal resource and the multiplexed resource of other users can be used as the candidate resource of the D2D network.

More specifically, a condition for judging whether the candidate resource can be used as the component carrier of the D2D user includes: a carrier aggregation user terminal supporting a frequency band occupied by the resource; and/or having no interference to other component carriers of the current user.

If the above candidate resource can be used as the above component carrier, a D2D connection is established for the UEs satisfying the condition, and the network resource is allocated for the UEs and used as the component carrier of the UEs, if the candidate resource cannot be used as the component carrier, data are transmitted according to an ordinary cellular communication mode.

In the embodiment, as mentioned in the above specific form of expression, the network resource required for performing D2D communication allocated for the UE group is required to meet the requirement that the network resource can be used as the component carrier. Specifically, allocating the network resource required for performing D2D communication for each UE in the UE group can include at least one of the following processing processes: allocating a network resource orthogonal to a mobile communication network for each UE; and allocating a network resource multiplexed with other UEs except the UE group for each UE. Specifically, it can make the above network resource satisfy at least one of the following conditions: (1) with respect to each UE in the UE group, a frequency band occupied by the network resource being supported; (2) with respect to each UE in the UE group, the component carrier having no interference to other component carriers of the UE itself.

When the above network resource orthogonal to the mobile communication network and the above network resource multiplexed with other UEs except the UE group coexist, in order to reduce interference, the network resource orthogonal to the mobile communication network can be preferentially allocated for each UE.

In the embodiment, the above component data information not only includes component data blocks constituting the above datum to be transmitted, it can also include target UE identification information of the component data blocks. The target UE identification information can be convenient for one UE within the UE group to share the component data of other UEs within the UE group. Therefore, the UEs performing D2D communication orderly request other users within the D2D for retransmitting component data blocks of the other users according to the priority and the received target UE identification information (e.g. a target UE identity (abbreviated as id)) of other component data blocks, the way of the UEs retransmitting the data blocks can be a broadcasting way, and after all the component data blocks are accurately transmitted, each UE can obtain a complete total data block.

Figure 2:
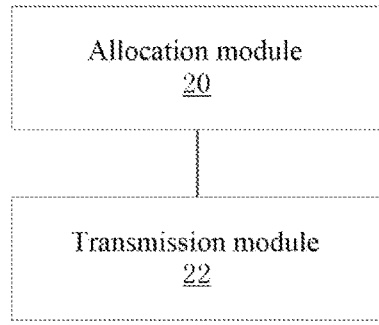
FIG. 2 is a block diagram of a structure of a data transmission device according to the embodiment 1 of the present document.

A data transmission device is also provided in the embodiment, the device is applied to the base station and used for implementing the above example and preferred embodiments thereof, what have been described will not be repeated, and modules related in the device will be described below. For example, a term "module" used below can be a combination of software and/or hardware for implementing preset functions. Though the device described in the following embodiments is preferentially implemented by software, an implementation by hardware or a combination of software and hardware is also possible and conceived. FIG. 2 is a block diagram of a structure of a data transmission device according to the embodiment 1 of the present document. As shown in FIG. 2, the device includes:

an allocation module 20, connected to a transmission module 22, and configured to: allocate to each user equipment UE in a UE group a network resource required for performing device to device D2D communication, and use the network resource as a component carrier of each UE, wherein, each UE supports carrier aggregation CA; and a transmission module 22, configured to: divide data to be transmitted to the UE group into multiple pieces of component data information to respectively transmit to each UE, wherein, each UE shares the multiple pieces of component data information transmitted to each UE via the component carrier.

Through the functions implemented by the above modules, the convergence of the carrier aggregation and the D2D technology also can be achieved.

In the embodiment, the above allocation module 20 is configured to allocate the network resource for each UE in at least one of the following ways: allocating a network resource orthogonal to a mobile communication network for each UE; allocating a network resource multiplexed with other UEs except the UE group for each UE.

It should be noted that, the functions implemented by the above modules are not limited to this, and the functions implemented by the above modules can include the related functions in the above method embodiment.

Embodiment 2

Figure 3:
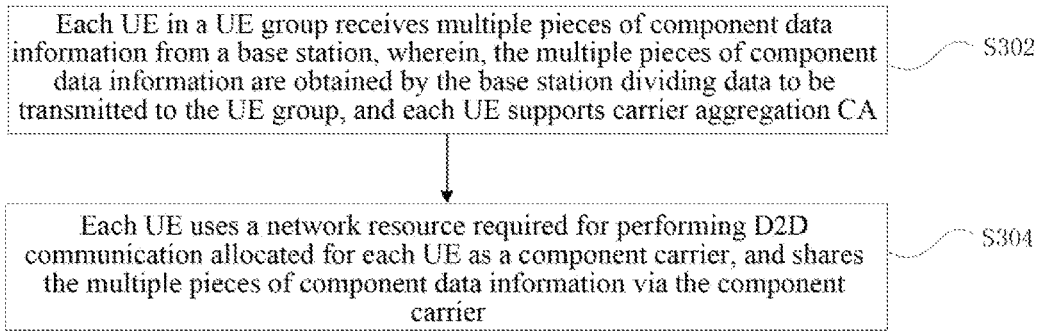
FIG. 3 is a flow chart of a data receiving method according to the embodiment 2 of the present document.

Descriptions are made from a UE side in the embodiment, and a data receiving method is provided. FIG. 3 is a flow chart of the data receiving method according to the embodiment 2 of the present document. As shown in FIG. 3, the method includes the following processing steps.

In step S302, each UE in a UE group receives multiple pieces of component data information from a base station, wherein, the multiple pieces of component data information are obtained by the base station dividing data to be transmitted to the UE group, and each UE supports carrier aggregation CA.

In step S304, each UE uses a network resource required for performing D2D communication allocated for each UE as a component carrier, and shares the multiple pieces of component data information via the component carrier.

In the embodiment, each UE can orderly share the component data information according to a preset priority.

Figure 4:
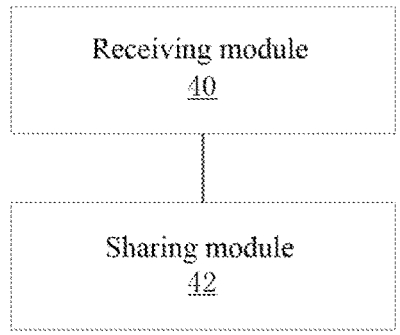
FIG. 4 is a block diagram of a structure of a data receiving device according to the embodiment 2 of the present document.

A data receiving device is also provided in the embodiment and used for implementing the above method, the device is applied to each UE in the UE group, and as shown in FIG. 4, the device includes:

a receiving module 40, connected to a sharing module 42, and configured to: receive multiple pieces of component data information from a base station, wherein, the multiple pieces of component data information are obtained by the base station dividing data to be transmitted to the UE group, and each UE supports CA; and a sharing module 42, configured to: use a network resource required for performing device to device D2D communication allocated for each UE as a component carrier, and share the multiple pieces of component data information via the component carrier.

Embodiment 3

The embodiment provides a scheme of performing data transmission by using D2D in the carrier aggregation, and with the scheme, the load of the cellular communication network can be reduced on the one hand, and the transmission efficiency of the cellular network can also be improved on the other hand.

Figure 5:
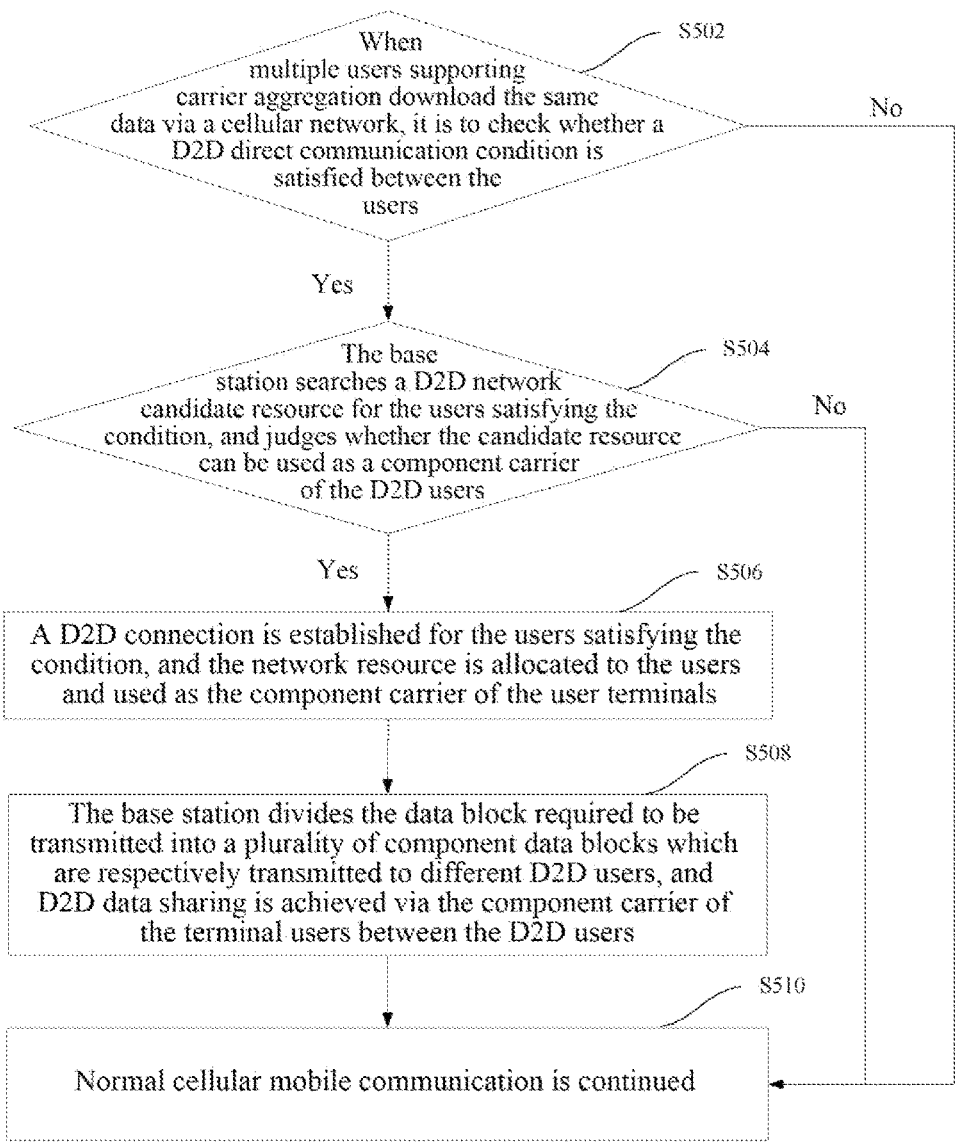
FIG. 5 is a flow chart of a data transmission method according to the embodiment 3 of the present document.

In order to solve and achieve the above object, the embodiment provides a data transmission method, and as shown in FIG. 5, the method includes the following processing steps.

In step S502, when multiple UEs supporting carrier aggregation download the same datum via a cellular network, it is to check whether a D2D direct communication condition is satisfied between the UEs.

Specifically, the number of UEs satisfying the D2D direct communication condition can be two, and it can also be a D2D group composed of more than two UEs.

It is assumed that the three UEs UE1, UE2 and UE3 are all required to download a data block B via the base station, and the UE1, UE2 and UE3 satisfy the D2D direct communication condition, it can be considered that the UE1, UE2 and UE3 form a D2D group.

In step S504, if the step S502 is satisfied, the base station searches a D2D network candidate resource for the UEs satisfying the condition, and judges whether the candidate resource can be used as a component carrier of the D2D UEs. If the step S502 is not satisfied, it skips to step S510.

Specifically, the base station preferentially allocates a resource orthogonal to the cellular network for the UEs satisfying the D2D direct communication, and if there is no orthogonal resource, a resource of other cellular mobile UEs is multiplexed. Both the orthogonal resource and the multiplexed resource of other UEs can be used as the candidate resource of the D2D network.

Specifically, a condition for judging whether it can be used as the component carrier of the UE within the D2D cluster includes:

a carrier aggregation UE terminal supporting a frequency band occupied by the resource; and/or having no interference to other component carriers of the current UE.

Figure 6:
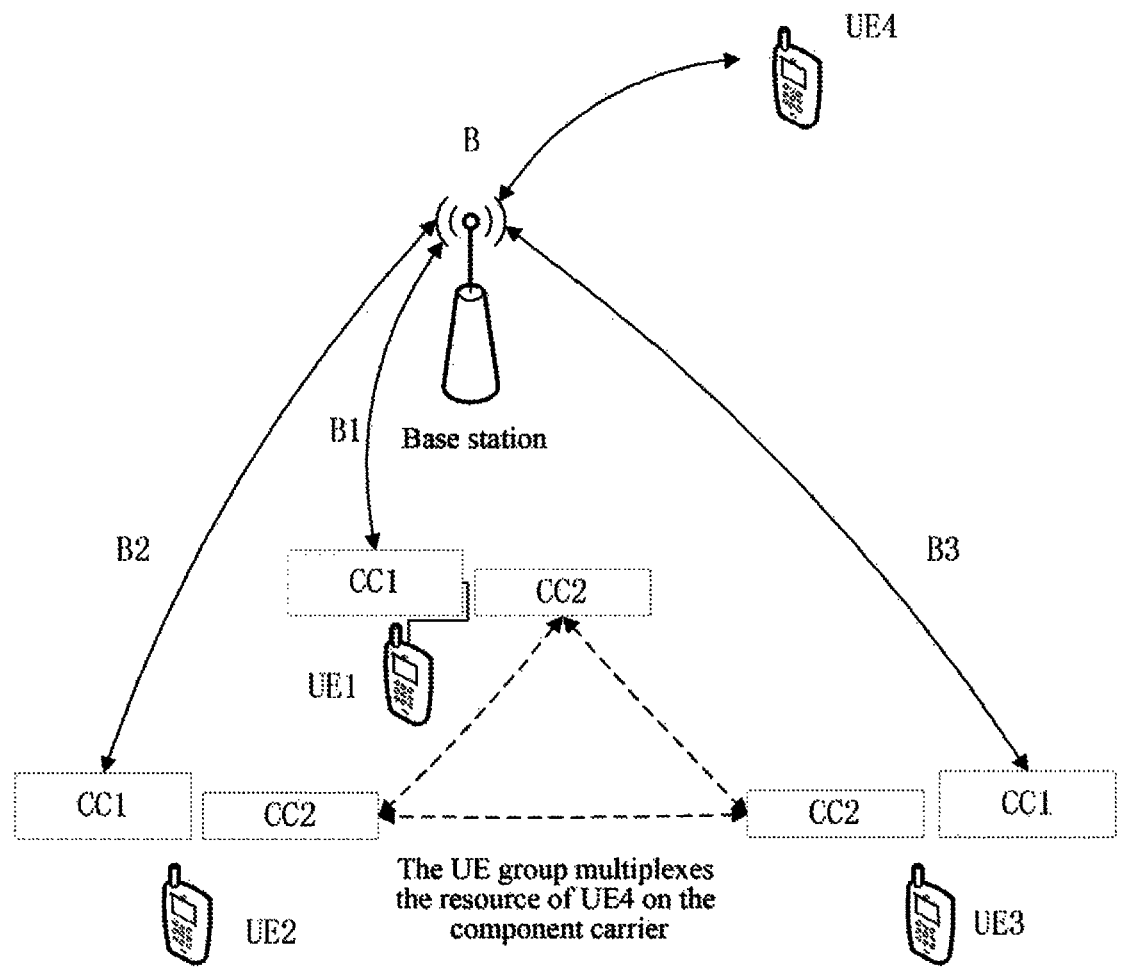
FIG. 6 is a schematic diagram of a scenario when a resource of UE4 is multiplexed according to the embodiment 3 of the present document.

A resource of UE4 is multiplexed in the embodiment, that is, the resource of UE4 can be used as a candidate resource of the D2D cluster, and it is assumed that the UEs UE1, UE2 and UE 3 all support the UE4 to serve as the component carrier. Wherein, a scenario when the resource of UE4 is multiplexed may refer to FIG. 6.

In step S506, if the step S504 is satisfied, a D2D connection is established for the UEs satisfying the condition, and the network resource is allocated to the UEs and used as the component carrier of the D2D UE terminals, and if the step S504 is not satisfied, it skips to step S510.

Based on the judgment, in the embodiment, if the multiplexed resource of UE4 satisfies the condition of the step S504, the resource of UE4 is allocated to the UEs within the UE group performing D2D communication and used as the component carrier.

In step S508, the base station divides the data block required to be transmitted into multiple component data blocks to be respectively transmitted to different UEs, and D2D data sharing is achieved via the allocated component carrier between the UEs.

The base station divides the data block B required to be transmitted into three component data blocks: B=B1+B2+B3, it is assumed that a B1 is transmitted to the UE1, a B2 is transmitted to the UE2, and a B3 is transmitted to the UE3.

Figure 7:
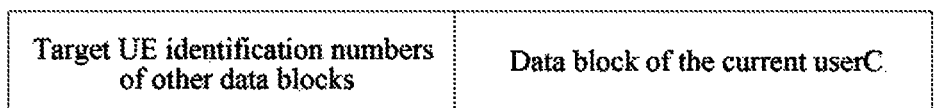
FIG. 7 is a schematic diagram of a composition structure of component data information according to the embodiment 3 of the present document.

As a preferred embodiment of the example, in the step S508, as shown in FIG. 7, the information transmitted by the base station to different UEs not only includes the component data blocks, but also at least includes target UE identification numbers of other component data blocks.

Figure 8:
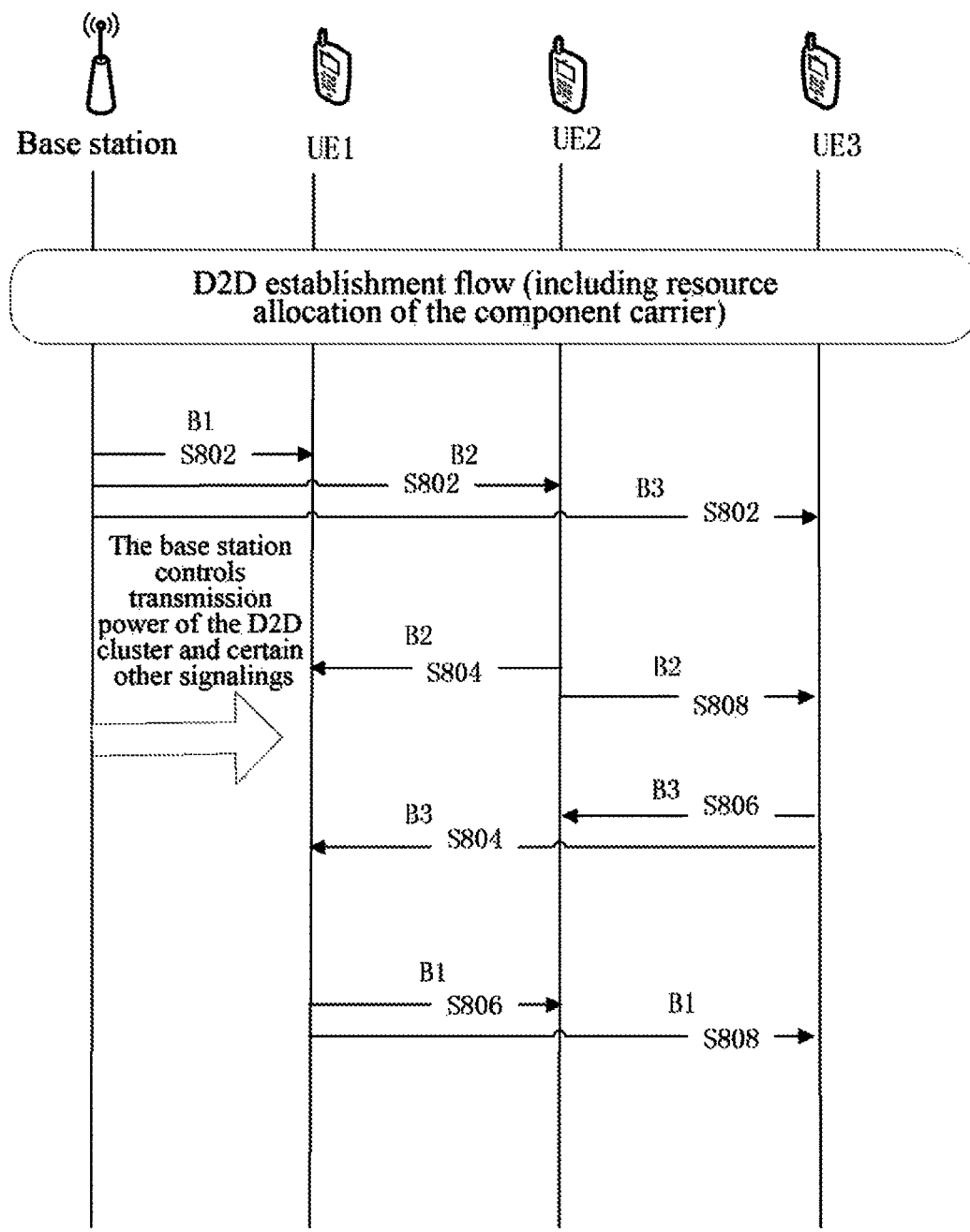
FIG. 8 is a schematic diagram of sharing the component data information based on priority according to the embodiment 3 of the present document.

The UEs within the D2D cluster orderly request other UEs within the D2D for retransmitting component data blocks of the other UEs according to the priority and the received target UE identification numbers of other component data blocks, the way of the UEs retransmitting the data blocks can be a broadcasting way, and after all the component data blocks are accurately transmitted, each UE can obtain a complete total data block. As shown in FIG. 8, a preferred data file transmission process includes the following processing steps. In step S802, the total data block is divided into a B1, a B2 and a B3 to be respectively sent to the UE1, UE2 and UE3, and what are sent simultaneously also include target UE ids of other component data blocks. In step S804, a priority sequence is set as UE1, UE2 and UE3 from high to low. The priority of the UE1 is the highest, thus the UE1 firstly requests other UEs with component data to share the component data with the UE1 (the component data are broadcasted within the D2D group). In step S806, the UE2 with the suboptimal UE priority requests other UEs with component data to share the component data with the UE2. In step S808, the UE3 with the suboptimal UE priority requests other UEs with component data to share the component data with the UE3.

In step S510, normal cellular mobile communication is continued.

It can be seen from the above embodiments that the following beneficial effects are achieved in the embodiments of the present document.

By using the D2D in the carrier aggregation to perform communication on the component carrier, the load of the cellular network can be reduced on the one hand, and the transmission efficiency of the cellular network also can be greatly improved on the other hand. The present document is particularly applicable to a scenario of enhancing a rate through carrier aggregation when it is required to provide real-time supramaximal service download, but there is no idle frequency spectrum in the cellular mobility.

In another embodiment, software is also provided, and the software is used for executing the above embodiments and the technical scheme described in the preferred embodiments.

In another embodiment, a storage medium is also provided, the above software is stored in the storage medium, and the storage medium includes but is not limited to: an optical disk, a floppy disk, a hard disk and an erasable memory, etc.

Apparently, the skilled in the art should understand that the modules or steps of the present document mentioned above can be implemented through a universal calculating device, and they can be concentrated on a single calculating device or distributed in a network consisting of multiple calculating devices. Alternatively, the modules or steps can be implemented through program codes which can be executed by the calculating device, thus, they can be stored in a storage device to be executed by the calculating device, and in some cases, the illustrated or described steps can be executed in a sequence different from here, or they can be made into multiple integrated circuit modules respectively, or multiple modules or steps of them can be made into a single integrated circuit module to be implemented. Therefore, the present document is not limited to any combination of hardware and software in a specific form.

The above description is only the preferred embodiments of the present document, which is not used to limit the present document. The present document can have various modifications and changes for the skilled in the art. All the modifications, equivalent substitutions, and improvements, etc. made within the spirit and principle of the present document shall fall into the protection scope of the present document.

INDUSTRIAL APPLICABILITY

Compared with the related art, with the method and device provided in the embodiments of the present document, by using the D2D in the carrier aggregation to perform communication on the component carrier, the load of the cellular network is reduced on the one hand, and the transmission efficiency of the cellular network is also greatly improved on the other hand, which is particularly applicable to a scenario of enhancing a rate through the carrier aggregation when it is required to provide real-time supramaximal service download, but there is no idle frequency spectrum in the cellular mobility.

What is claimed is:

1. A data transmission method, applied to a base station, comprising:
    allocating, by the base station, to each user equipment (UE) in a UE group a network resource required for performing device to device (D2D) communication, and using the network resource as a component carrier of each UE in the UE group, wherein, each UE in the UE group supports carrier aggregation (CA); and
    splitting, by the base station, a data block to be transmitted to the UE group into multiple component data blocks; and
    transmitting, by the base station, a different component data block of the component data blocks and target UE identifiers of other component data blocks of the component data blocks to each UE in the UE group, wherein, each UE in the UE group shares the component data block received by that UE with other UEs in the UE group via the component carrier.

2. The method according to claim 1, wherein, the step of allocating, by the base station, to each user equipment (UE) in a UE group a network resource required for performing D2D communication comprises:
    allocating a network resource orthogonal to a mobile communication network for each UE in the UE group; and/or
    allocating a network resource multiplexed with other UEs except the UE group for each UE in the UE group.

3. The method according to claim 2, wherein, in the step of allocating, by the base station, to each user equipment (UE) in a UE group a network resource required for performing D2D communication, the network resource orthogonal to the mobile communication network is allocated for each UE in the UE group.

4. The method according to claim 1, further comprising: before using the network resource as a component carrier of each UE in the UE group, determining that the network resource is used as the component carrier through at least one of the following conditions:
    with respect to each UE in the UE group, a frequency band occupied by the network resource being supported; and
    with respect to each UE in the UE group, a component carrier having no interference to other component carriers of that UE.

5. A data receiving method comprising:
    each user equipment (UE) in a UE group receiving a different component data block of component data blocks and target UE identifiers of other component data blocks of the component data blocks from a base station, wherein, the component data blocks are obtained by splitting, by the base station, a data block to be transmitted to the UE group into multiple component data blocks, and each UE in the UE group supports carrier aggregation (CA);
    each UE in the UE group using a network resource required for performing device to device (D2D) communication allocated for each UE in the UE group as a component carrier; and
    each UE in the UE group sharing the component data block received by that UE with other UEs in the UE group via the component carrier.

6. The method according to claim 5, wherein, the step of each UE in the UE group sharing the component data block received by that UE with other UEs in the UE group via the component carrier comprises:
    each UE in the UE group orderly sharing the component data block received by that UE with other UEs in the UE group according to a preset priority.

7. A data transmission device, as a base station, comprising:
    a non-transitory storage device of the base station; and
    a calculating device of the base station, the calculating device configured to execute modules stored in the non-transitory storage device to implement steps, the modules comprising:
    an allocation module, configured to: allocate to each user equipment (UE) in a UE group a network resource required for performing device to device (D2D) communication, and use the network resource as a component carrier of each UE in the UE group, wherein, each UE in the UE group supports carrier aggregation (CA); and
    a transmission module, configured to: split a data block to be transmitted to the UE group into multiple component data blocks and transmit a different component data block of the component data blocks and target UE identifiers of other component data blocks of the component data blocks to each UE in the UE group, wherein, each UE in the UE group shares the component data block received by that UE with other UEs in the UE group via the component carrier.

8. The device according to claim 7, wherein, the allocation module is configured to allocate the network resource for each UE in the UE group in at least one of the following ways:
    allocating a network resource orthogonal to a mobile communication network for each UE in the UE group;
    allocating a network resource multiplexed with other UEs except the UE group for each UE in the UE group.

9. A data receiving device comprising:
    a non-transitory storage device; and
    a calculating device configured to execute modules stored in the non-transitory storage device to implement steps, the modules comprising:
    a receiving module, configured to: receive a component data block of component data blocks and target UE identifiers of other component data blocks of the component data blocks from a base station, wherein, the component data blocks are obtained by splitting, by the base station, a data block to be transmitted to a UE group into multiple component data blocks, and each UE in the UE group supports carrier aggregation (CA); and a sharing module, configured to: use a network resource required for performing device to device (D2D) communication allocated for each UE in the UE group as a component carrier, and share the component data block received with other UEs in the UE group via the component carrier, wherein each UE in the UE group receive a different component data block of the component data blocks from the base station and each UE in the UE group comprise the data receiving device.

* * * * *